(12) United States Patent
Jiang et al.

(10) Patent No.: US 10,558,217 B2
(45) Date of Patent: Feb. 11, 2020

(54) METHOD AND APPARATUS FOR MONITORING OF AN AUTONOMOUS VEHICLE

(71) Applicant: GM Global Technology Operations LLC, Detroit, MI (US)

(72) Inventors: Shengbing Jiang, Rochester Hills, MI (US); Mutasim A. Salman, Madison, WI (US); Yilu Zhang, Northville, MI (US); Shiming Duan, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 185 days.

(21) Appl. No.: 15/688,429

(22) Filed: Aug. 28, 2017

(65) Prior Publication Data

US 2019/0064810 A1    Feb. 28, 2019

(51) Int. Cl.
*G05D 1/00* (2006.01)
*G06K 9/00* (2006.01)
*G06K 9/62* (2006.01)

(52) U.S. Cl.
CPC ......... *G05D 1/0088* (2013.01); *G05D 1/0055* (2013.01); *G06K 9/00201* (2013.01); *G06K 9/00791* (2013.01); *G06K 9/6262* (2013.01)

(58) Field of Classification Search
CPC .............. G05D 1/0088; G05D 1/0055; G06K 9/00791; G06K 9/00201
See application file for complete search history.

(56) References Cited

U.S. PATENT DOCUMENTS

| | | | |
|---|---|---|---|
| 2018/0137386 A1* | 5/2018 | Cohen | G06K 9/00201 |
| 2018/0200745 A1* | 7/2018 | Dudar | B05B 12/004 |
| 2018/0276494 A1* | 9/2018 | Fernandez | B61L 23/042 |
| 2018/0293466 A1* | 10/2018 | Viswanathan | G06K 9/00791 |
| 2019/0068582 A1* | 2/2019 | Kim | H04L 63/0823 |

* cited by examiner

*Primary Examiner* — Hunter B Lonsberry
*Assistant Examiner* — Mathew Franklin Gordon
(74) *Attorney, Agent, or Firm* — Quinn IP Law

(57) ABSTRACT

A perception module of a spatial monitoring system to monitor and characterize a spatial environment proximal to an autonomous vehicle is described. A method for evaluating the perception module includes capturing and storing a plurality of frames of data associated with a driving scenario for the autonomous vehicle, and executing the perception module to determine an actual spatial environment for the driving scenario, wherein the actual spatial environment for the driving scenario is stored in the controller. The perception module is executed to determine an estimated spatial environment for the driving scenario based upon the stored frames of data associated with the driving scenario, and the estimated spatial environment is compared to the actual spatial environment for the driving scenario. A first performance index for the perception module is determined based upon the comparing, and a fault can be detected.

17 Claims, 5 Drawing Sheets

METHOD AND APPARATUS FOR MONITORING OF AN AUTONOMOUS VEHICLE

INTRODUCTION

Autonomous vehicles can include on-board monitoring systems to detect occurrence of a fault or another indication of a need for service and/or vehicle maintenance.

SUMMARY

An autonomic vehicle control system is described, and includes a perception module of a spatial monitoring system that is executed to monitor and characterize a spatial environment proximal to the autonomous vehicle. A controller is in communication with the spatial monitoring subsystem, and the controller includes a processor and a memory device including an instruction set. A method for evaluating the perception module includes capturing and storing a plurality of frames of data associated with a driving scenario for the autonomous vehicle, and executing the perception module to determine an actual spatial environment for the driving scenario, wherein the actual spatial environment for the driving scenario is stored in the controller. The perception module is executed to determine an estimated spatial environment for the driving scenario based upon the stored frames of data associated with the driving scenario, and the estimated spatial environment is compared to the actual spatial environment for the driving scenario. A first performance index for the perception module is determined based upon the comparing of the estimated spatial environment and the actual spatial environment, and a fault is detected in the perception module based upon the first performance index. Occurrence of the fault is reported to a service center.

An aspect of the disclosure includes determining the first performance index based upon correctly detected objects, undetected objects and falsely detected objects in the estimated spatial environment as compared to the actual spatial environment.

Another aspect of the disclosure includes the autonomous vehicle including a plurality of spatial sensors and a GPS tracking device in communication with the perception module, wherein the method further includes dynamically monitoring data inputs from the GPS tracking device and the spatial sensors, and determining that the autonomous vehicle is operating in the driving scenario based upon the data inputs from the GPS tracking device. The perception module determines a second perceived spatial environment for the driving scenario based upon the dynamically monitored data inputs from the spatial sensors, and the second perceived spatial environment for the driving scenario is compared with and the actual spatial environment for the driving scenario. A second performance index for the perception module is determined based upon the comparing of the perceived spatial environment and the stored actual spatial environment for the driving scenario, and a fault in the perception module is determined based upon the second performance index.

Another aspect of the disclosure includes dynamically monitoring data inputs from the GPS tracking device and the spatial sensors, determining that the autonomous vehicle is operating in the driving scenario based upon the data inputs from the GPS tracking device and dynamically monitoring data inputs from the spatial sensors. The method includes determining, via the perception module, a second perceived spatial environment for the driving scenario based upon the dynamically monitored data inputs from the spatial sensors, and determining, via a second vehicle that is coincidently operating in the same driving scenario, a second actual spatial environment for the driving scenario. The second perceived spatial environment is compared with the second actual spatial environment for the driving scenario, and a third performance index for the perception module is determined based upon the comparing of the third perceived spatial environment and the actual spatial environment. A fault in the perception module is determined based upon the third performance index.

Another aspect of the disclosure includes the driving scenario being associated with a geographic location.

Another aspect of the disclosure includes the plurality of inputs to the perception module being vehicle dynamic data, map data and spatial environment data for the driving scenario, wherein capturing and storing a plurality of frames of data associated with a driving scenario for the autonomous vehicle comprises periodically capturing and storing vehicle dynamic data, map data and spatial environment data during the driving scenario.

Another aspect of the disclosure includes the perception module being configured to monitor input from a spatial sensor disposed to monitor the spatial environment proximal to the vehicle.

Another aspect of the disclosure includes the spatial sensor being a camera, a radar device or a lidar device.

Another aspect of the disclosure includes determining the first performance index based upon correctly detected objects, undetected objects and falsely detected objects in the estimated spatial environment as compared to the actual spatial environment.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, technical material that is understood in the related art has not been described in detail in order to avoid unnecessarily obscuring the disclosure. Furthermore, the disclosure, as illustrated and described herein, may be practiced in the absence of an element that is not specifically disclosed herein.

Figure 1:
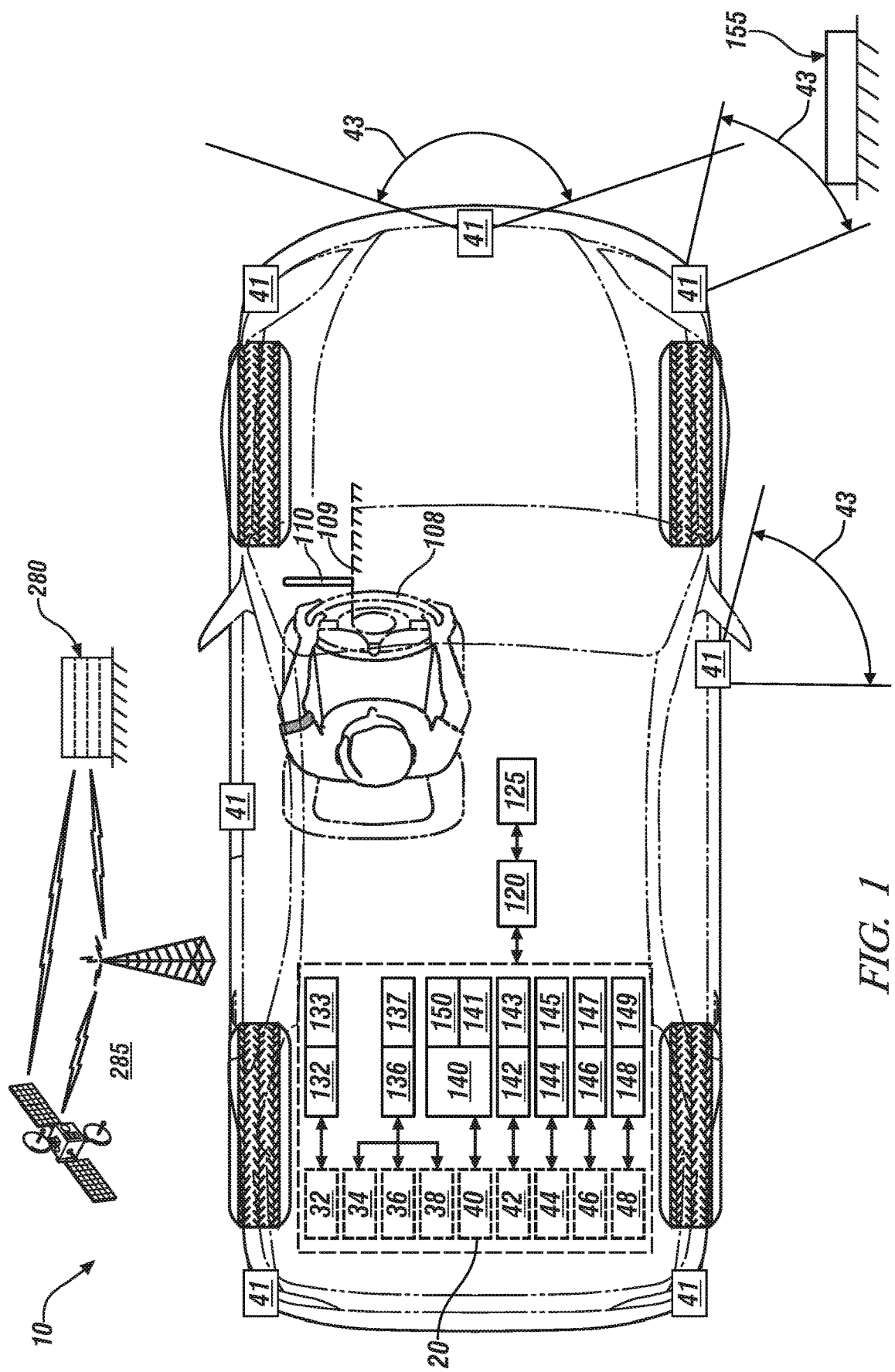
FIG. 1 schematically shows a vehicle including an autonomic vehicle control system and associated controllers, in accordance with the disclosure.

Referring to the drawings, wherein like reference numerals correspond to like or similar components throughout the several Figures, FIG. 1, consistent with embodiments disclosed herein, illustrates a vehicle 10 that includes an autonomic vehicle control system 20 and an associated vehicle health monitoring (VHM) controller 120 that is illustrative of the concepts described herein. The vehicle 10 includes, in one embodiment, a four-wheel passenger vehicle with steerable front wheels and fixed rear wheels. The vehicle 10 may include, by way of non-limiting examples, a passenger vehicle, a light-duty or heavy-duty truck, a utility vehicle, an agricultural vehicle, an industrial/warehouse vehicle, or a recreational off-road vehicle.

As employed herein, the autonomic vehicle control system 20 includes an on-vehicle control system that is capable of providing a level of driving automation. The terms 'driver' and 'operator' describe the person responsible for directing operation of the vehicle 10, whether actively involved in controlling one or more vehicle functions or directing autonomous vehicle operation. Driving automation can include a range of dynamic driving and vehicle operation. Driving automation can include some level of automatic control or intervention related to a single vehicle function, such as steering, acceleration, and/or braking, with the driver continuously having overall control of the vehicle. Driving automation can include some level of automatic control or intervention related to simultaneous control of multiple vehicle functions, such as steering, acceleration, and/or braking, with the driver continuously having overall control of the vehicle. Driving automation can include simultaneous automatic control of vehicle driving functions, including steering, acceleration, and braking, wherein the driver cedes control of the vehicle for a period of time during a trip. Driving automation can include simultaneous automatic control of vehicle driving functions, including steering, acceleration, and braking, wherein the driver cedes control of the vehicle for an entire trip. Driving automation includes hardware and controllers configured to monitor the spatial environment under various driving modes to perform various driving tasks during dynamic operation. Driving automation can include, by way of non-limiting examples, cruise control, adaptive cruise control, lane-change warning, intervention and control, automatic parking, acceleration, braking, and the like.

The autonomic vehicle control system 20 preferably includes one or a plurality of vehicle systems and associated controllers that provide a level of driving automation, and the VHM controller 120 is disposed to monitor, prognosticate and/or diagnose operation of the autonomic vehicle control system 20. The vehicle systems, subsystems and controllers associated with the autonomic vehicle control system 20 are implemented to execute one or a plurality of operations associated with autonomous vehicle functions, including, by way of non-limiting examples, an adaptive cruise control (ACC) operation, lane guidance and lane keeping operation, lane change operation, steering assist operation, object avoidance operation, parking assistance operation, vehicle braking operation, vehicle speed and acceleration operation, vehicle lateral motion operation, e.g., as part of the lane guidance, lane keeping and lane change operations, etc. The vehicle systems and associated controllers of the autonomic vehicle control system 20 can include, by way of non-limiting examples, a drivetrain 32 and drivetrain controller (PCM) 132; a steering system 34, a braking system 36 and a chassis system 38, which are controlled by a vehicle controller (VCM) 136; a vehicle spatial monitoring system 40 and spatial monitoring controller 140, a human-machine interface (HMI) system 42 and HMI controller 142; an HVAC system 44 and associated HVAC controller 144; operator controls 46 and an associated operator controller 146; and a vehicle lighting, illumination and external signaling system 48 and associated controller 148.

Each of the vehicle systems and associated controllers may further include one or more subsystems and an associated controller. The subsystems and controllers are shown as discrete elements for ease of description. The foregoing classification of the subsystems is provided for purposes of describing one embodiment, and is illustrative. Other configurations may be considered within the scope of this disclosure. It should be appreciated that the functions described and performed by the discrete elements may be executed using one or more devices that may include algorithmic code, calibrations, hardware, application-specific integrated circuitry (ASIC), and/or off-board or cloud-based computing systems. Each of the aforementioned controllers includes a VHM agent, which can be implemented and executed as algorithmic code, calibrations, hardware, application-specific integrated circuitry (ASIC), or other elements. Each of the VHM agents is configured to perform component and sub-system monitoring, feature extraction, data filtering and data recording for the associated controller. The data recording can include periodic and/or event-based data recording, single time-point data recording and/or consecutive time-point data recording for certain time duration, such as before and/or after the trigger of an event. Such data recording can be accomplished employing circular memory buffers or another suitable memory device.

The PCM 132 communicates with and is operatively connected to the drivetrain 32, and executes control routines to control operation of an engine and/or other torque machines, a transmission and a driveline, none of which are shown, to transmit tractive torque to the vehicle wheels in response to driver inputs, external conditions, and vehicle operating conditions. The PCM 132 is shown as a single controller, but can include a plurality of controller devices operative to control various powertrain actuators, including the engine, transmission, torque machines, wheel motors, and other elements of the drivetrain 32, none of which are shown. By way of a non-limiting example, the drivetrain 32 can include an internal combustion engine and transmission, with an associated engine controller and transmission controller. Furthermore, the internal combustion engine may include a plurality of discrete subsystems with individual controllers, including, e.g., an electronic throttle device and controller, fuel injectors and controller, etc. The drivetrain 32 may also be composed of an electrically-powered motor/generator with an associated power inverter module and inverter controller. The control routines of the PCM 132 may also include an adaptive cruise control system (ACC) that controls vehicle speed, acceleration and braking in response to driver inputs and/or autonomous vehicle control inputs. The PCM 132 also includes a PCM VHM agent 133.

The VCM 136 communicates with and is operatively connected to a plurality of vehicle operating systems and executes control routines to control operation thereof. The vehicle operating systems can include braking, stability control, and steering, which can be controlled by actuators associated with the braking system 36, the chassis system 38 and the steering system 34, respectively, which are controlled by the VCM 136. The VCM 136 is shown as a single controller, but can include a plurality of controller devices operative to monitor systems and control various vehicle actuators. The VCM 136 also includes a VCM VHM agent 137.

The steering system 34 is configured to control vehicle lateral motion. The steering system 34 can include an electrical power steering system (EPS) coupled with an active front steering system to augment or supplant operator input through a steering wheel 108 by controlling steering angle of the steerable wheels of the vehicle 10 during execution of an autonomic maneuver such as a lane change maneuver. An exemplary active front steering system permits primary steering operation by the vehicle driver including augmenting steering wheel angle control to achieve a desired steering angle and/or vehicle yaw angle. Alternatively or in addition, the active front steering system can provide complete autonomous control of the vehicle steering function. It is appreciated that the systems described herein are applicable with modifications to vehicle steering control systems such as electrical power steering, four/rear wheel steering systems, and direct yaw control systems that control traction of each wheel to generate a yaw motion.

The braking system 36 is configured to control vehicle braking, and includes wheel brake devices, e.g., disc-brake elements, calipers, master cylinders, and a braking actuator, e.g., a pedal. Wheel speed sensors monitor individual wheel speeds, and a braking controller can be mechanized to include anti-lock braking functionality.

The chassis system 38 preferably includes a plurality of on-board sensing systems and devices for monitoring vehicle operation to determine vehicle motion states, and, in one embodiment, a plurality of devices for dynamically controlling a vehicle suspension. The vehicle motion states preferably include, e.g., vehicle speed, steering angle of the steerable front wheels, and yaw rate. The on-board sensing systems and devices include inertial sensors, such as rate gyros and accelerometers. The chassis system 38 estimates the vehicle motion states, such as longitudinal speed, yaw-rate and lateral speed, and estimates lateral offset and heading angle of the vehicle 10. The measured yaw rate is combined with steering angle measurements to estimate the vehicle state of lateral speed. The longitudinal speed may be determined based upon signal inputs from wheel speed sensors arranged to monitor each of the front wheels and rear wheels. Signals associated with the vehicle motion states that can be communicated to and monitored by other vehicle control systems for vehicle control and operation.

The vehicle spatial monitoring system 40 and spatial monitoring controller 140 can include a controller and a plurality of spatial sensors 41, wherein each of the spatial sensors 41 is disposed on-vehicle to monitor a field of view 43 of objects and geographic regions that are proximal to the vehicle 10. The spatial monitoring controller 140 generates digital representations of each of the fields of view including proximate remote objects based upon data inputs from the spatial sensors. The spatial monitoring controller 140 also includes a spatial monitoring VHM agent 141. The spatial monitoring controller 140 can evaluate inputs from the spatial sensors 41 to determine a linear range, relative speed, and trajectory of the vehicle 10 in view of each proximate remote object. The spatial sensors 41 can be located at various locations on the vehicle 10, including the front corners, rear corners, rear sides and mid-sides. The spatial sensors 41 can include a front radar sensor and a camera in one embodiment, although the disclosure is not so limited. Placement of the aforementioned spatial sensors 41 permits the spatial monitoring controller 140 to monitor traffic flow including proximate vehicles and other objects around the vehicle 10. Data generated by the spatial monitoring controller 140 may be employed by a lane mark detection processor (not shown) to estimate the roadway. The spatial sensors 41 of the vehicle spatial monitoring system 40 can further include object-locating sensing devices including range sensors, such as FM-CW (Frequency Modulated Continuous Wave) radars, pulse and FSK (Frequency Shift Keying) radars, and Lidar (Light Detection and Ranging) devices, and ultrasonic devices which rely upon effects such as Doppler-effect measurements to locate forward objects. The possible object-locating devices include charged-coupled devices (CCD) or complementary metal oxide semiconductor (CMOS) video image sensors, and other camera/video image processors which utilize digital photographic methods to 'view' forward objects including one or more vehicle(s). Such sensing systems are employed for detecting and locating objects in automotive applications and are useable with systems including, e.g., adaptive cruise control, autonomous braking, autonomous steering and side-object detection.

The spatial sensors 41 associated with the vehicle spatial monitoring system 40 are preferably positioned within the vehicle 10 in relatively unobstructed positions to monitor the spatial environment. As employed herein, the spatial environment includes external elements including fixed objects such as signs, poles, trees, houses, stores, bridges, etc.; and, moving or moveable objects such as pedestrians and other vehicles. Each of these spatial sensors 41 provides an estimate of actual location or condition of an object, wherein said estimate includes an estimated position and standard deviation. As such, sensory detection and measurement of object locations and conditions are typically referred to as 'estimates.' It is further appreciated that the characteristics of these spatial sensors 41 are complementary, in that some are more reliable in estimating certain parameters than others. The spatial sensors 41 can have different operating ranges and angular coverages capable of estimating different parameters within their operating ranges. For example, radar sensors can usually estimate range, range rate and azimuth location of an object, but are not normally robust in estimating the extent of a detected object. A camera with vision processor is more robust in estimating a shape and azimuth position of the object, but is less efficient at estimating the range and range rate of an object. Scanning type lidar sensors perform efficiently and accurately with respect to estimating range, and azimuth position, but typically cannot estimate range rate, and are therefore not as accurate with respect to new object acquisition/recognition. Ultrasonic sensors are capable of estimating range but are generally incapable of estimating or computing range rate and azimuth position. Further, it is appreciated that the performance of each sensor technology is affected by differing environmental conditions. Thus, some of the spatial sensors 41 present parametric variances during operation, although overlapping coverage areas of the sensors create opportunities for sensor data fusion.

The HVAC system 44 is disposed to manage the ambient environment of the passenger compartment, including, e.g., temperature, humidity, air quality and the like, in response to operator commands that are communicated to the HVAC controller 144, which controls operation thereof. The HVAC controller 144 also includes an HVAC VHM agent 145.

The operator controls 46 can be included in the passenger compartment of the vehicle 10 and may include, by way of non-limiting examples, a steering wheel 108, an accelerator pedal, a brake pedal and an operator input device 110. The operator controls 46 and associated operator controller 146 enable a vehicle operator to interact with and direct operation of the vehicle 10 in functioning to provide passenger transportation. The operator controller 146 also includes an operator controller VHM agent 147. The operator control devices including the steering wheel 108, accelerator pedal, brake pedal, transmission range selector and the like may be omitted in some embodiments of the autonomous vehicle 10.

The steering wheel 108 can be mounted on a steering column 109 with the input device 110 mechanically mounted on the steering column 109 and configured to communicate with the operator controller 146. Alternatively, the input device 110 can be mechanically mounted proximate to the steering column 109 in a location that is convenient to the vehicle operator. The input device 110, shown herein as a stalk projecting from column 109, can include an interface device by which the vehicle operator may command vehicle operation in one or more autonomic control modes, e.g., by commanding activation of element(s) of the autonomic vehicle control system 20. The mechanization of the input device 110 is illustrative. The input device 110 may be mechanized in one or more of a plurality of devices, or may be in the form of a controller that is voice-activated, or may be another suitable system. The input device 110 preferably has control features and a location that is used by present turn-signal activation systems. Alternatively, other input devices, such as levers, switches, buttons, and voice recognition input devices can be used in place of or in addition to the input device 110.

The HMI system 42 provides for human/machine interaction, for purposes of directing operation of an infotainment system, an on-board GPS tracking device, a navigation system and the like, and includes an HMI controller 142. The HMI controller 142 monitors operator requests and provides information to the operator including status of vehicle systems, service and maintenance information. The HMI controller 142 can also include a global positioning/navigation system. The HMI controller 142 communicates with and/or controls operation of a plurality of operator interface devices, wherein the operator interface devices are capable of transmitting a message associated with operation of one of the autonomic vehicle control systems. The HMI controller 142 may also communicate with one or more devices that monitor biometric data associated with the vehicle operator, including, e.g., eye gaze location, posture, and head position tracking, among others. The HMI controller 142 is depicted as a unitary device for ease of description, but may be configured as a plurality of controllers and associated sensing devices in an embodiment of the system described herein. The HMI controller 142 also includes an HMI VHM agent 143. Operator interface devices can include that devices that are capable of transmitting a message urging operator action, and can include an electronic visual display module, e.g., a liquid crystal display (LCD) device, a heads-up display (HUD), an audio feedback device, a wearable device and a haptic seat. The operator interface devices that are capable of urging operator action are preferably controlled by or through the HMI controller 142. The HUD may project information that is reflected onto an interior side of a windshield of the vehicle, in the field of view of the operator, including transmitting a confidence level associated with operating one of the autonomic vehicle control systems. The HUD may also provide augmented reality information, such as lane location, vehicle path, directional and/or navigational information, and the like. HUD and related systems are known to those skilled in the art.

The vehicle lighting, illumination and external signaling system 48 includes a plurality of headlamps, tail lamps, brake lamps, marker lamps, signal lamps, and the like, which are controllable via the lighting controller 148. The lighting controller 148 is in communication with ambient light sensors, the GPS system, and the navigation system, and executes control routines that selectively illuminate various ones of the headlamps, tail lamps, brake lamps, marker lamps, signal lamps based upon the ambient light, the direction of intended travel from the GPS and navigation systems, and other factors. Other factors may include an override command to illuminate the vehicle lamps in a construction zone. The lighting controller 148 also includes a lighting VHM agent 149.

In one embodiment, the vehicle 10 is configured to communicate with the communication network 285, including communicating between a controller associated with an intelligent highway system and the vehicle 10. An intelligent highway system can be configured to monitor locations, speeds and trajectories of a plurality of vehicles, with such information employed to facilitate control of one or a plurality of similarly-situated vehicles. This can include communicating geographic location, forward velocity and acceleration rate of one or more vehicles in relation to the vehicle 10. In one embodiment, the vehicle 10 is configured to communicate with an off-board controller 280 via the communication network 285.

The VHM controller 120 is configured to autonomously monitor health of various on-board subsystems that perform one or more functions related to autonomous vehicle operation. The VHM controller 120 includes a controller architecture that is configured with multilayer hierarchical VHM data processing, collection, and storage employing the plurality of VHM agents that are associated with a VHM master controller that can communicate with the off-board controller 280. This configuration can serve to reduce data processing complexity, data collection and data storage costs. The VHM controller 120 provides a centralized system monitoring and a distributed system monitoring arrangement with data collection via the VHM master controller and the plurality of VHM agents to provide a rapid response time and an integrated vehicle/system level coverage. The VHM controller 120 can also include a fault mitigation controller and a redundant VHM master controller to verify integrity of VHM information employed by the fault mitigation controller.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine-readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. The term 'model' refers to a processor-based or processor-executable code and associated calibration that simulates a physical existence of a device or a physical process. The terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. The terms "calibration", "calibrate", and related terms refer to a result or a process that compares an actual or standard measurement associated with a device with a perceived or observed measurement or a commanded position. A calibration as described herein can be reduced to a storable parametric table, a plurality of executable equations or another suitable form.

Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. A parameter is defined as a measurable quantity that represents a physical property of a device or other element that is discernible using one or more sensors and/or a physical model. A parameter can have a discrete value, e.g., either "1" or "0", or can be infinitely variable in value.

The terms "prognosis", "prognostics", and related terms are associated with data monitoring and algorithms and evaluations that render an advance indication of a likely future event associated with a component, a subsystem, or a system. Prognostics can include classifications that include a first state that indicates that the component, subsystem, or system is operating in accordance with its specification ("Green" or "G"), a second state that indicates deterioration in the operation of the component, subsystem, or system ("Yellow" or "Y"), and a third state that indicates a fault in the operation of the component, subsystem, or system ("Red" or "R"). The terms "diagnostics", "diagnosis" and related terms are associated with data monitoring and algorithms and evaluations that render an indication of presence or absence of a specific fault with a component, subsystem or system. The term "mitigation" and related terms are associated with operations, actions or control routine that operate to lessen the effect of a fault in a component, subsystem or system.

The telematics controller 125 includes a wireless telematics communication system capable of extra-vehicle communications, including communicating with a communication network system 285 having wireless and wired communication capabilities. The telematics controller 125 is capable of extra-vehicle communications that includes short-range vehicle-to-vehicle (V2V) communication. Alternatively or in addition, the telematics controller 125 has a wireless telematics communication system capable of short-range wireless communication to a handheld device, e.g., a cell phone, a satellite phone or another telephonic device. In one embodiment the handheld device is loaded with a software application that includes a wireless protocol to communicate with the telematics controller, and the handheld device executes the extra-vehicle communication, including communicating with the off-board controller 280 via the communication network 285. Alternatively or in addition, the telematics controller executes the extra-vehicle communication directly by communicating with the off-board controller 280 via a communication network 285.

Prognostic classification routines to determine a prognostic, i.e., R/Y/G, for each of the subsystems can be executed in the VHM controller 120. The prognostic classification routines can detect occurrence of a Green prognostic associated with one of the vehicle subsystems and associated controllers of the autonomic vehicle control system 20, and the VHM controller 120 can block associated data transmission off board via the communication network 285 to reduce data communication load to the off-board controller 280. Alternatively, the transmission of a Green prognostic can be in the form of a simple acknowledgement of Green determination for a component, subsystem, or system of one of the vehicle systems and associated controllers of the autonomic vehicle control system 20 with a time stamp, thus minimizing the data transmission load to the off-board controller 280.

The VHM controller 120 includes executable routines that evaluate on-vehicle devices that monitor the spatial environment proximal the autonomous vehicle 10, including, e.g., the spatial sensors 41, the vehicle spatial monitoring system 40, spatial monitoring controller 140 and spatial monitoring VHM agent 141 that are described with reference to FIG. 1.

The spatial monitoring controller 140 includes a perception module 150 that is configured to monitor the spatial environment proximal to the autonomous vehicle 10. Data inputs to the perception module 150 include the plurality of spatial sensors 41, geographic location inputs from the GPS system, a 3D map having detailed information related to the spatial environment, and inputs from the on-board sensing systems and devices. The on-board sensing systems and devices include inertial sensors, such as wheel speed sensors, rate gyros, accelerometers, steering angle sensors, and other on-vehicle elements that are disposed to determine the vehicle motion states such as longitudinal speed, yaw-rate and lateral speed, and lateral offset and heading angle of the vehicle 10.

The perception module 150 is disposed on-vehicle to monitor and characterize the spatial environment proximal to the vehicle 10, which is provided to the vehicle systems and associated controllers of the autonomic vehicle control system 20 to provide a level of driving automation. Data and signal inputs to the perception module 150 include spatial environment data in the form of inputs from the spatial sensors 41, which include cameras, radars, lidars, etc. Data inputs to the perception module 150 further include map date in the form of a detailed 3D map of the surrounding environment and position data from the GPS. Data inputs to the perception module 150 further includes vehicle dynamic data in the form of data collected from in-vehicle sensors such as gyros and wheel speed sensors. Data inputs to the perception module 150 further includes information communicated from other vehicles, e.g., V2V data, and information communicated from the infrastructure, e.g., V2X data.

The perception module 150 includes localization, object detection, and classification algorithms to estimate the position of the current road, the current traffic lane, the types and position of objects and obstacles, including both static and dynamic obstacles and objects. The perception module 150 can estimate motion and behavior of the surrounding moving obstacles on the road and on the traffic lane.

Figure 2:
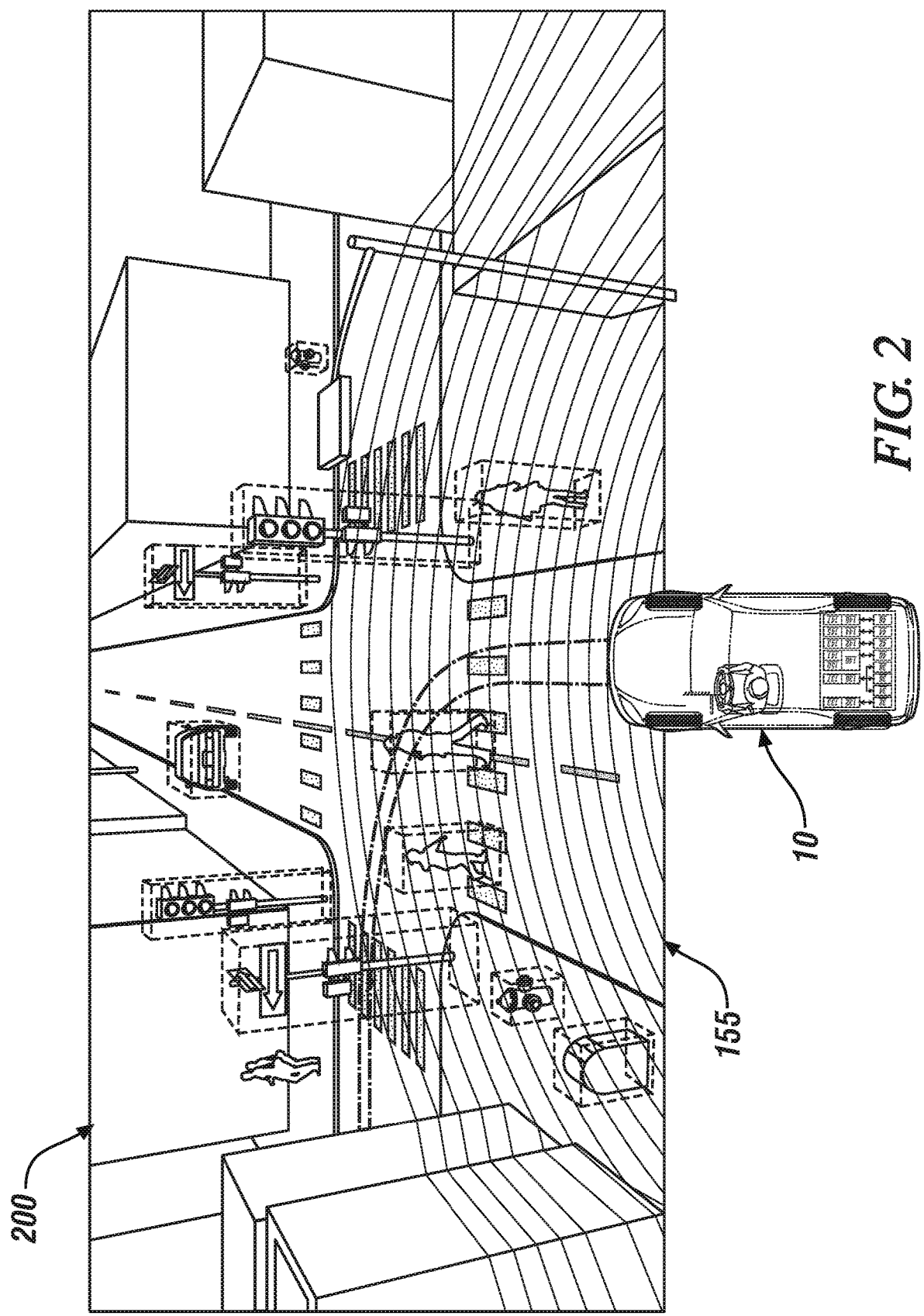
FIG. 2 illustrates an isometric depiction of a spatial environment at a geographic location, wherein the spatial environment is proximal to an embodiment of the autonomous vehicle described with reference to FIG. 1, in accordance with the disclosure.

FIG. 2 illustrates an isometric depiction of a frame of a spatial environment 200 at a geographic location 155, wherein the spatial environment 200 is proximal to an embodiment of the vehicle 10 described with reference to FIG. 1. The isometric depiction includes elements that can be an output from the perception module 150 for the vehicle 10. The perception module 150 can include information indicating a position of the vehicle 10 in relation to the current road and current traffic lane, types and position of objects and obstacles (both static and dynamic), and a prediction of the motion and behavior of the surrounding moving obstacles on the road and on the traffic lane.

Figure 3:
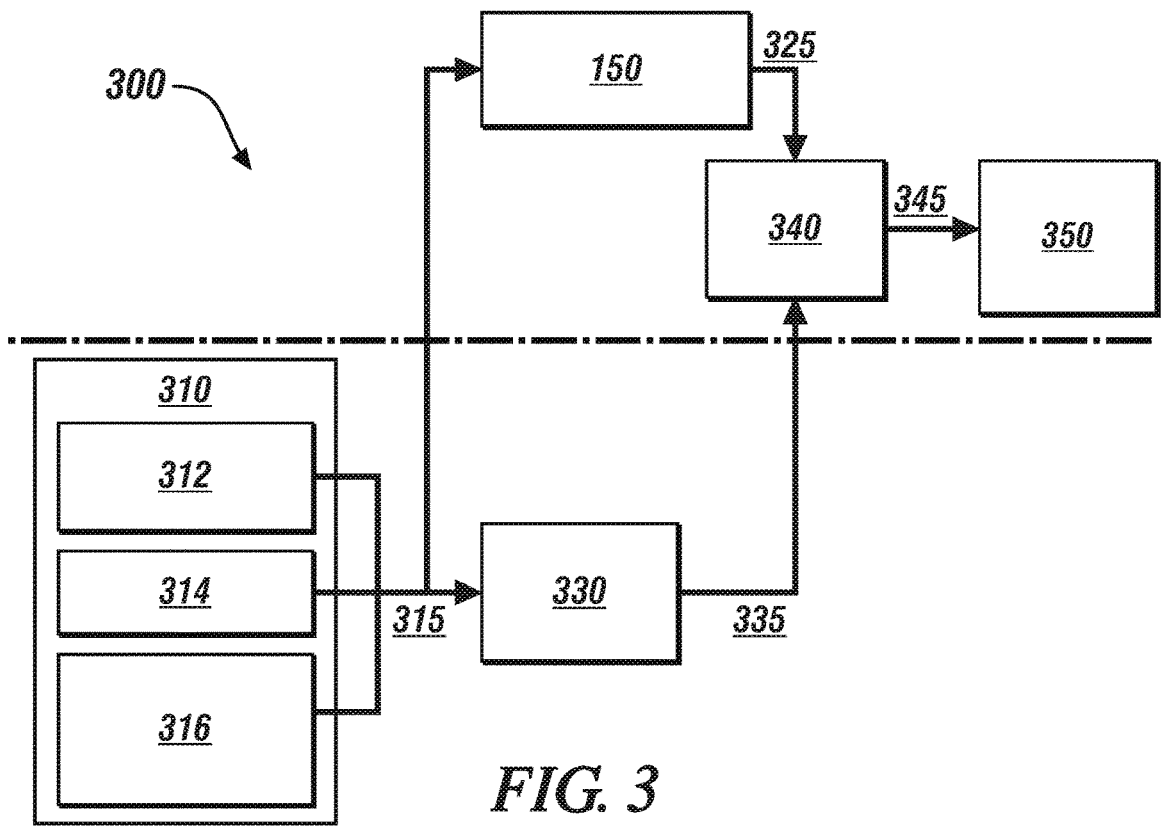
FIG. 3 schematically shows an information flow diagram for executing an off-line evaluation of a perception module that is employed on an autonomous vehicle, in accordance with the disclosure.

FIG. 3 schematically shows an information flow diagram for executing an off-line evaluation 300 of an embodiment of the perception module 150 that is employed on the vehicle 10. The off-line evaluation 300 executes periodically to determine whether the perception module 150 is functioning as intended, i.e., verifying whether or not the spatial environment proximal to the vehicle 10 as detected by the perception module 150 accurately reflects an actual spatial environment proximal to the vehicle 10. In each case described herein, the actual spatial environment for a driving scenario is composed of features and characteristics that have been independently verified, including, e.g., verification by experts. The off-line evaluation 300 is preferably executed as one or a plurality of control routines by the VHM controller 140, employing information stored therein or available from other devices either on-vehicle or off-vehicle.

The off-line evaluation 300 includes capturing and storing a plurality of data inputs 310 in the form of a plurality of sequentially captured frames of data for a stored driving scenario 315, wherein the stored driving scenario 315 includes a spatial environment associated with a geographic location that includes a perspective and a field of view that is based upon a position and heading of the vehicle. The frames of data for the stored driving scenario 315 include spatial environment data 316, which includes inputs from the on-vehicle spatial sensors 41, including data from the cameras, radars, lidars, etc. The frames of data for the stored driving scenario 315 also include map data 314, which includes inputs from a detailed 3D map of the surrounding environment for the geographic location, which can be stored in a database that is either on-vehicle or is off-vehicle at a remote location and accessible to the vehicle controllers, e.g., a cloud-based computing system. The frames of data for the stored driving scenario 315 also include vehicle dynamic data 312, which includes vehicle position and heading data that can be obtained from the on-vehicle GPS and data from in-vehicle sensors such as gyros and wheel speed sensors.

Each of the driving scenarios is composed of a plurality of sequential frames, wherein each frame includes a grid of pixels generated by the spatial sensors 41 of the vehicle and measurements of the environment originating from the map data, including roads, road lanes, buildings, static objects, traffic signs, pedestrian and other moving objects such as vehicles. FIG. 2 is a graphical depiction of one of the frames.

The vehicle dynamic data 312, map data 314 and spatial environment data 316 form the stored driving scenario 315, which is in the form of frames that are stored to the comprehensive database 330. The comprehensive database 330 also stores the datafile that represents an actual spatial environment 335 for the stored driving scenario 315, including objects, roads, static and moving obstacles, traffic roads and lane positions.

The stored driving scenario 315 is input to the perception module 150, which evaluates the vehicle dynamic data 312, map data 314 and spatial environment data 316 to generate an estimated spatial environment 325 for the stored driving scenario 315. The estimated spatial environment 325 for the stored driving scenario 315 includes a position of the road, the traffic lane, the type of road, the classification and the position of objects and obstacles (both static and dynamic) and a predicted motion and behavior of the surrounding moving obstacles on the road and in the lane. The estimated spatial environment 325 for the stored driving scenario 315 is comparatively evaluated relative the actual spatial environment 335 in block 340. The comparative evaluation step 340 includes determining a performance index 345 that relates to detection of errors in the estimated spatial environment 325 for the stored driving scenario 315. One example of a performance index is as follows:

$$SOH = \frac{\sum \text{correct objects } id.(i) * Wc(i)}{\sum (\text{correct objects } (i)id * Wc(i) + \text{missed objects } (i)id. * Wm(i) + \text{False objects } id.(i) * Wf(i))} \quad [1]$$

wherein:
$\Sigma$ correct objects id.(i) is a numeric count of objects correctly detected by the estimated spatial environment 325 for the stored driving scenario 315;
$\Sigma$ missed objects id.(i) is a numeric count of objects not detected by the estimated spatial environment 325 for the stored driving scenario 315;
$\Sigma$ false objects id.(i) is a numeric count of objects falsely detected by the estimated spatial environment 325 for the stored driving scenario 315; and Wc(i), Wm(i) and Wf(i) are weighting factors for the respective correctly detected objects, undetected objects and falsely detected objects in the estimated spatial environment as compared to the actual spatial environment.

The value of the weighting parameters Wc(i), Wm(i) and Wf(i) are related to the importance of the identification and classification of the various objects to the autonomous driving. For example, if an object is close to the vehicle 10 and it is in its driving path, the weight value is high, and if an object is remote from the vehicle and it is not in its driving path, the weight value is low.

The performance index 345 or SOH can be evaluated, as indicated in block 350, which includes determining if there is a need to execute further evaluation to detect occurrence of a fault in the perception module 150, or the vehicle spatial monitoring system 40 of the autonomous vehicle 10.

Figure 4:
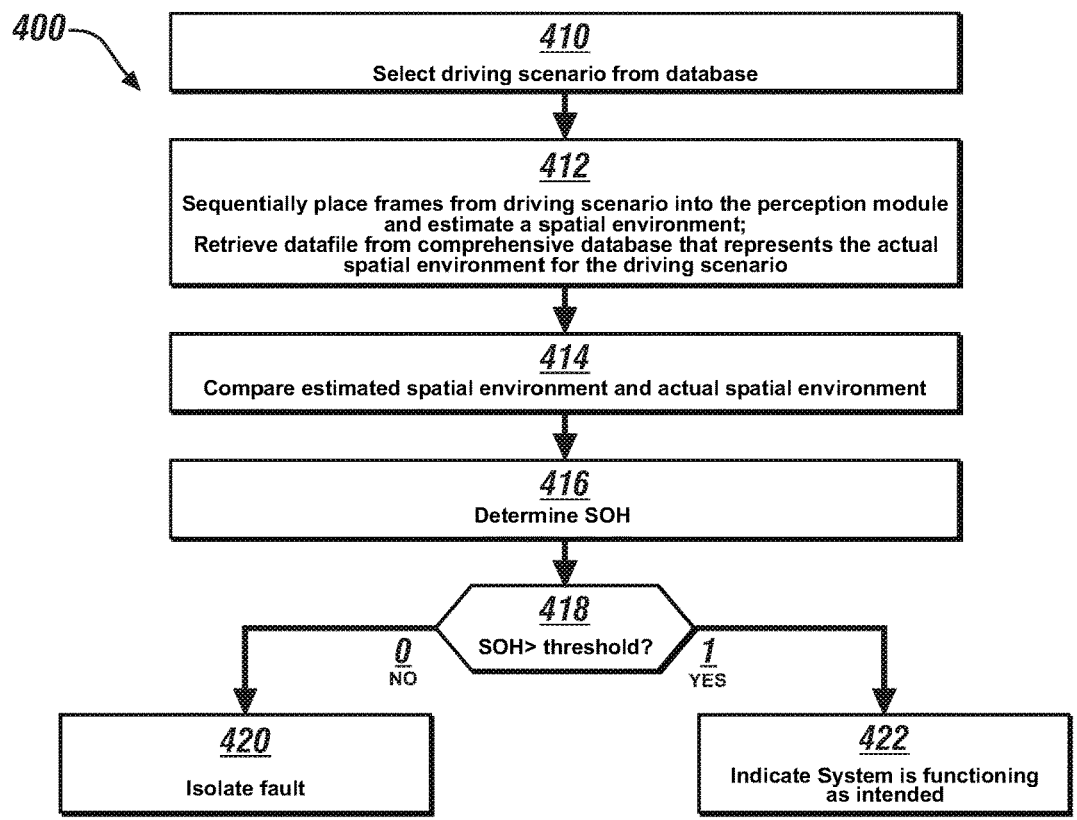
FIG. 4 schematically shows an embodiment of a routine for off-line evaluation of the perception module, in accordance with the disclosure.

FIG. 4 schematically shows an embodiment of a routine 400 for off-line evaluation of the perception module 150, which can be executed as one or a plurality of control routines by the VHM controller 140, employing information stored therein or available from other devices either on-vehicle or off-vehicle. The routine 400 executes periodically to determine whether the perception module 150 is functioning as intended, i.e., verifying whether or not the spatial environment proximal to the vehicle 10 as detected by the perception module 150 accurately reflects an actual spatial environment proximal to the vehicle 10. Table 1 is provided as a key wherein the numerically labeled blocks and the corresponding functions are set forth as follows, corresponding to the routine 400. The teachings may be described herein in terms of functional and/or logical block components and/or various processing steps. It should be realized that such block components may be composed of hardware, software, and/or firmware components that have been configured to perform the specified functions.

TABLE 1

| BLOCK | BLOCK CONTENTS |
| --- | --- |
| 410 | Select driving scenario from database |
| 412 | Sequentially place frames from driving scenario into the perception module and estimate a spatial environment Retrieve datafile from comprehensive database that represents the actual spatial environment for the driving scenario |
| 414 | Compare estimated spatial environment and actual spatial environment |
| 416 | Determine SOH |
| 418 | Is SOH greater than threshold? |
| 420 | Isolate fault and service vehicle |
| 422 | Indicate system is functioning as intended; update database |

Execution of the routine 400 for off-line evaluation of the perception module 150 may proceed as follows. The steps of the routine 400 may be executed in a suitable order, and are not limited to the order described with reference to FIG. 4. The routine 400 includes selecting a driving scenario from the database (410), and sequentially places frames from the driving scenario into the perception module 300, which estimates a spatial environment based thereon. Simultaneously, a datafile is retrieved from the comprehensive database representing the actual spatial environment for the driving scenario (412). The estimated spatial environment is compared to the actual spatial environment (414) and a performance index (SOH) is calculated, e.g., as shown with reference to EQ. 1 (416). When the SOH is greater than a threshold value (418)(1), the routine 400 reports that the perception module 150 is functioning as intended, and the database is updated, and this iteration ends (422). When the SOH is less than the threshold value (418)(0), the routine 400 reports occurrence of a fault to the operator, to a fleet manager, and/or to a remote service center, and isolates the fault for service (420).

Figure 5:
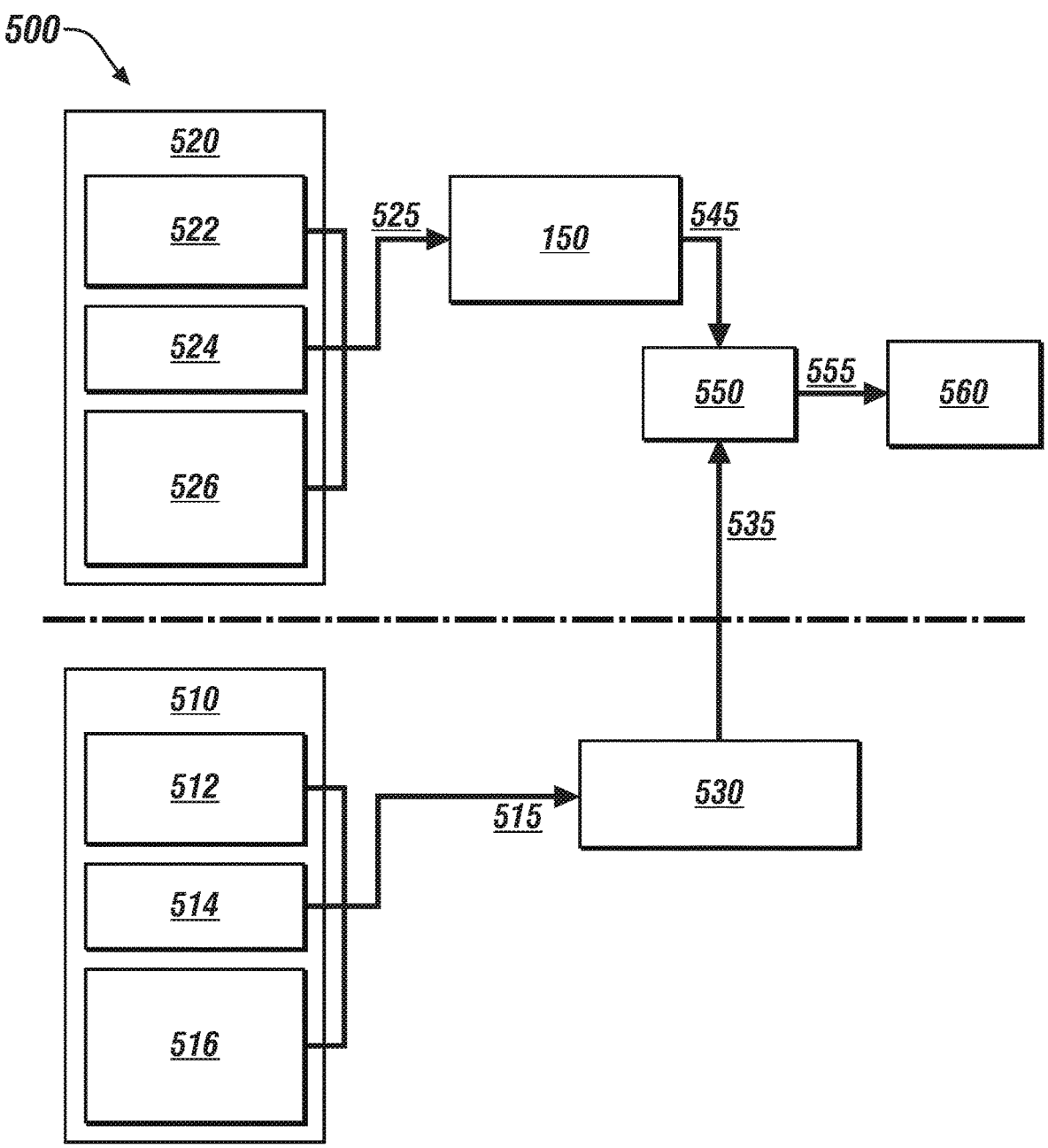
FIG. 5 schematically shows an information flow diagram for executing a dynamic evaluation of the perception module, in accordance with the disclosure.

FIG. 5 schematically shows an information flow diagram for executing dynamic evaluation 500 of an embodiment of the perception module 150 that is employed on the vehicle 10. The dynamic evaluation 500 executes periodically to determine whether the perception module 150 is functioning as intended, i.e., verifying whether or not the spatial environment proximal to the vehicle 10 as detected by the perception module 150 accurately reflects an actual spatial environment proximal to the vehicle 10. The dynamic evaluation 500 is preferably executed as one or a plurality of control routines by the VHM controller 140, employing information stored therein or available from other devices either on-vehicle or off-vehicle, e.g., a cloud-based computing system.

The dynamic evaluation 500 includes capturing and storing a plurality of data inputs 510 stored to the database in the form of a plurality of frames of data for a driving scenario 515, wherein the captured driving scenario 515 includes a spatial environment associated with a geographic location that includes a perspective and a field of view that is based upon position and heading of the vehicle 10. The frames of data for the captured driving scenario 515 include spatial environment data 516, which includes inputs from the on-vehicle spatial sensors 41, including data from the cameras, radars, lidars, etc. The frames of data for the driving scenario 515 also include map data 514, which includes inputs from a detailed 3D map of the surrounding environment for the geographic location, which can be stored in a database that is either on-vehicle or is accessible from a remote location. The frames of data for a driving scenario 515 also include vehicle dynamic data 512, which includes position data from the on-vehicle GPS and data from in-vehicle sensors such as gyros and wheel speed sensors.

The comprehensive database 530 also stores the datafile that represents the actual spatial environment 535 for the driving scenario 515, including objects, roads, static and moving obstacles, traffic roads and lane positions.

During dynamic operation of the vehicle 10, dynamic data inputs 520 for a real-time driving scenario 525 are monitored, wherein the real-time driving scenario 525 includes a spatial environment associated with a geographic location.

The dynamic data inputs 520 that form the real-time driving scenario 525 include spatial environment data 526, map data 524 and vehicle dynamic data 522, which includes position data from the on-vehicle GPS and data from in-vehicle sensors such as gyros and wheel speed sensors. The real-time driving scenario 525 is input to the perception module 150, which generates the estimated spatial environment 545 for the driving scenario 525. The estimated spatial environment 545 for the driving scenario 525 includes a position of the road, the traffic lane, the type of road, the classification and the position of objects and obstacles (both static and dynamic) and a predicted motion and behavior of the surrounding moving obstacles on the road and in the lane.

The estimated spatial environment 545 for the driving scenario 525 is comparatively evaluated relative the actual spatial environment 535 for the driving scenario 515 in block 550 under the condition that the real-time driving scenario 525 and the driving scenario 515 are the same. The comparative evaluation step 550 includes determining a performance index 555 that relates to detection of errors in the estimated spatial environment for the driving scenario 525. One example of the performance index 555 or SOH is described herein with reference to EQ. 1. The performance index 555 or SOH can be evaluated, as indicated in block 560, which includes determining if there is a need to execute further evaluation to detect occurrence of a fault in the perception module 150, or occurrence of a fault in the vehicle spatial monitoring system 40 of the autonomous vehicle 10.

Figure 6:
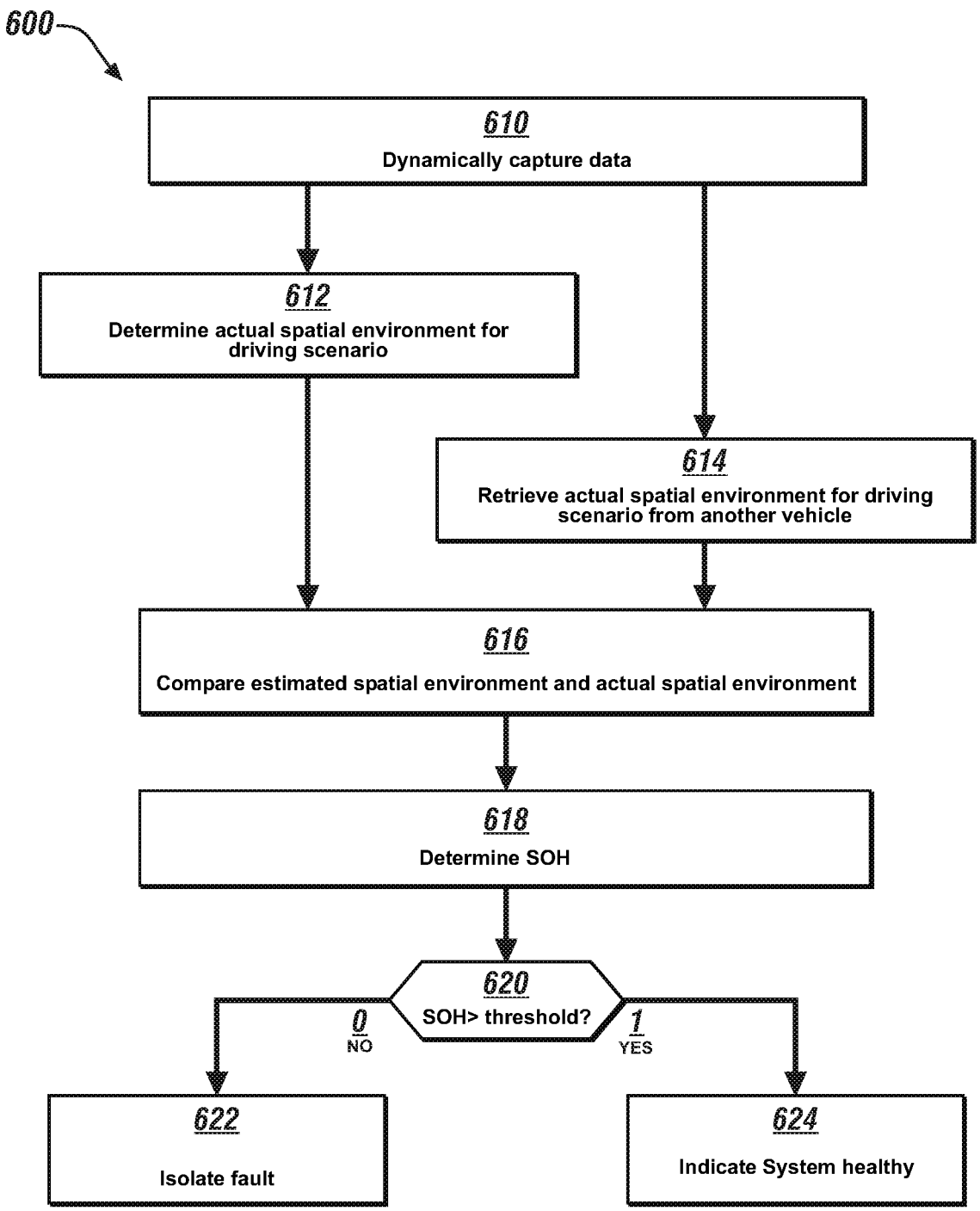
FIG. 6 schematically shows an embodiment of a routine for dynamic evaluation of the perception module, employing information stored therein or available from other devices either on-vehicle or off-vehicle, in accordance with the disclosure.

FIG. 6 schematically shows an embodiment of a routine 600 for dynamic evaluation of the perception module 150, which can be executed as one or a plurality of control routines by the VHM controller 140, employing information stored therein or available from other devices either on-vehicle or off-vehicle. The routine 600 executes periodically to determine whether the perception module 150 is functioning as intended, i.e., verifying whether or not the spatial environment proximal to the vehicle 10 as detected by the perception module 150 accurately reflects an actual spatial environment proximal to the vehicle 10. Table 2 is provided as a key wherein the numerically labeled blocks and the corresponding functions are set forth as follows, corresponding to the routine 600. The teachings may be described herein in terms of functional and/or logical block components and/or various processing steps. It should be realized that such block components may be composed of hardware, software, and/or firmware components that have been configured to perform the specified functions.

TABLE 2

| BLOCK | BLOCK CONTENTS |
|---|---|
| 610 | Dynamically capture data |
| 612 | Determine actual spatial environment for the driving scenario (Case 1) |
| 614 | Determine actual spatial environment for the driving scenario from another vehicle (Case 2) |
| 616 | Compare estimated spatial environment and actual spatial environment |
| 618 | Determine SOH |
| 620 | Is SOH greater than threshold? |
| 622 | Isolate fault and service vehicle |
| 624 | Indicate system is functioning as intended; update database |

Execution of the routine 600 for off-line evaluation of the perception module 150 may proceed as follows. The steps of the routine 600 may be executed in a suitable order, and are not limited to the order described with reference to FIG. 6. The routine 600 includes dynamically capturing data for a driving scenario during vehicle operation and estimating the spatial environment based thereon (610). The driving scenario includes a spatial environment associated with a geographic location. The captured data includes the aforementioned spatial environment data 526, map data 524 and vehicle dynamic data 522.

An actual spatial environment for the driving scenario is retrieved. In one embodiment, the actual spatial environment has been developed by the vehicle 10 and is captured on-board in a database (612). Alternatively, or as a second iteration of execution of the routine, the actual spatial environment has been developed by a second vehicle or plurality of vehicles that is configured similar to the vehicle 10 or a perception module that has been installed at the location that is coincidently operating in the same driving scenario. The second vehicle can be a calibration vehicle that has been configured in a manner analogous to the configuration of the vehicle 10 in one embodiment. The second vehicle may be coincidently operating in the same driving scenario as the vehicle 10 in one embodiment. Alternatively, the second vehicle may have previously developed calibration data for the driving scenario. The actual spatial environment is associated with externally generated set of data inputs for the driving scenario that is retrieved from a database that is captured on-board the other vehicle(s) (614).

The estimated spatial environment is compared to the actual spatial environment (616) and a performance index (SOH) is calculated, e.g., as described with reference to EQ. 1 (618). When the SOH is greater than a threshold value (620)(1), the routine 600 reports that the perception module 150 is functioning as intended, and the database is updated, and this iteration ends (624). When the SOH is less than the threshold value (618)(0), the routine 600 reports occurrence of a fault to the operator, to a fleet manager and/or to a remote service center, and isolates the fault for service (622).

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for evaluating a perception module disposed in an autonomous vehicle, wherein the perception module includes a plurality of routines that execute to characterize a spatial environment proximal to the autonomous vehicle, the method comprising:
    capturing and storing, via a controller, a plurality of frames of data associated with a driving scenario for the autonomous vehicle;
    determining an actual spatial environment for the driving scenario, wherein the actual spatial environment for the driving scenario is stored in the controller;
    executing the perception module to determine an estimated spatial environment for the driving scenario based upon the stored frames of data associated with the driving scenario;

comparing, via the controller, the estimated spatial environment and the actual spatial environment for the driving scenario;

determining a first performance index for the perception module based upon the comparing of the estimated spatial environment and the actual spatial environment, wherein the first performance index is determined based upon correctly detected objects, undetected objects and falsely detected objects in the estimated spatial environment as compared to the actual spatial environment, including subjecting each of the correctly detected objects, the undetected objects and the falsely detected objects to respective weighting factors to determine the first performance index, wherein each of the respective weighting factors is determined based upon proximity of the correctly detected objects, the undetected objects and the falsely detected objects to the autonomous vehicle and to a driving path of the autonomous vehicle;

detecting a fault in the perception module based upon the first performance index; and reporting occurrence of the fault to a service center.

2. The method of claim 1, wherein the autonomous vehicle includes a plurality of spatial sensors and a GPS tracking device in communication with the perception module, the method further comprising:

dynamically monitoring data inputs from the GPS tracking device and the spatial sensors;

determining that the autonomous vehicle is operating in the driving scenario based upon the data inputs from the GPS tracking device;

determining, via the perception module, a second perceived spatial environment for the driving scenario based upon the dynamically monitored data inputs from the spatial sensors;

comparing the second perceived spatial environment for the driving scenario and the actual spatial environment for the driving scenario, wherein the actual spatial environment for the driving scenario is retrieved from the database;

determining a second performance index for the perception module based upon the comparing of the perceived spatial environment and the stored actual spatial environment for the driving scenario; and detecting a fault in the perception module based upon the second performance index.

3. The method of claim 1, wherein the autonomous vehicle includes a plurality of spatial sensors and a GPS tracking device in communication with the perception module;

the method further comprising:

dynamically monitoring data inputs from the GPS tracking device and the spatial sensors;

determining that the autonomous vehicle is operating in the driving scenario based upon the data inputs from the GPS tracking device;

dynamically monitoring data inputs from the spatial sensors;

determining, via the perception module, a second perceived spatial environment for the driving scenario based upon the dynamically monitored data inputs from the spatial sensors;

determining, via a second vehicle that is coincidently operating in the same driving scenario, a second actual spatial environment for the driving scenario;

comparing the second perceived spatial environment and the second actual spatial environment for the driving scenario;

determining a third performance index for the perception module based upon the comparing of the third perceived spatial environment and the actual spatial environment; and detecting a fault in the perception module based upon the third performance index.

4. The method of claim 1, wherein the driving scenario is associated with a geographic location.

5. The method of claim 1, wherein the plurality of inputs to the perception module include vehicle dynamic data, map data and spatial environment data for the driving scenario, and wherein capturing and storing a plurality of frames of data associated with a driving scenario for the autonomous vehicle comprises periodically capturing and storing vehicle dynamic data, map data and spatial environment data during the driving scenario.

6. The method of claim 1, wherein the perception module is configured to monitor input from a spatial sensor disposed to monitor the spatial environment proximal to the vehicle.

7. The method of claim 6, wherein the spatial sensor comprises a camera.

8. The method of claim 6, wherein the spatial sensor comprises one of a radar device and a lidar device.

9. The method of claim 1, wherein determining the first performance index for the perception module based upon the comparing of the estimated spatial environment and the actual spatial environment comprises determining the first performance index based upon correctly detected objects, undetected objects and falsely detected objects in the estimated spatial environment as compared to the actual spatial environment, wherein the actual spatial environment for a driving scenario is composed of features and characteristics that have been independently verified.

10. The method of claim 1, wherein the plurality of frames of data associated with the driving scenario for the autonomous vehicle are stored in one of an off-board or cloud-based computing system.

11. An autonomous vehicle, comprising:

a plurality of spatial sensors disposed to monitor a spatial environment proximal to the autonomous vehicle;

a GPS tracking device disposed to monitor a position and heading of the autonomous vehicle;

a perception module disposed to characterize a spatial environment proximal to the autonomous vehicle based upon inputs from the spatial sensors and the GPS tracking device;

a controller in communication with the perception module, the spatial sensors and the GPS tracking device, the controller including an instruction set, the instruction set executable to:

capture and store a plurality of frames of data associated with a driving scenario for the autonomous vehicle;

determine an actual spatial environment for the driving scenario, wherein the actual spatial environment for the driving scenario is stored in the controller;

determine, via the perception module an estimated spatial environment for the driving scenario based upon the stored frames of data associated with the driving scenario;

compare the estimated spatial environment and the actual spatial environment for the driving scenario;

determine a first performance index for the perception module based upon the comparing of the estimated spatial environment and the actual spatial environment, wherein the first performance index is determined based upon correctly detected objects, undetected objects and falsely detected objects in the estimated spatial environment as compared to the actual spatial environment, including subjecting each of the correctly detected objects, the undetected objects and the falsely detected objects to respective weighting factors to determine the first performance index, wherein each of the respective weighting factors is determined based upon proximity of the correctly detected objects, the undetected objects and the falsely detected objects to the autonomous vehicle and to a driving path of the autonomous vehicle;

detect a fault in the perception module based upon the first performance index; and report occurrence of the fault to a service center.

12. The autonomous vehicle of claim 11, further comprising the instruction set executable to:

dynamically monitor data inputs from the GPS tracking device and the spatial sensors;

determine that the autonomous vehicle is operating in the driving scenario based upon the data inputs from the GPS tracking device;

determine, via the perception module, a second perceived spatial environment for the driving scenario based upon the dynamically monitored data inputs from the spatial sensors;

compare the second perceived spatial environment for the driving scenario and the actual spatial environment for the driving scenario, wherein the actual spatial environment for the driving scenario is retrieved from the database;

determine a second performance index for the perception module based upon the comparing of the perceived spatial environment and the stored actual spatial environment for the driving scenario; and detect a fault in the perception module based upon the second performance index.

13. The autonomous vehicle of claim 11, further comprising the instruction set executable to:

dynamically monitor data inputs from the GPS tracking device and the spatial sensors;

determine that the autonomous vehicle is operating in the driving scenario based upon the data inputs from the GPS tracking device;

dynamically monitor data inputs from the spatial sensors;

determine, via the perception module, a second perceived spatial environment for the driving scenario based upon the dynamically monitored data inputs from the spatial sensors;

determine, via a second vehicle that is coincidently operating in the same driving scenario, a second actual spatial environment for the driving scenario;

compare the second perceived spatial environment and the second actual spatial environment for the driving scenario;

determine a third performance index for the perception module based upon the comparing of the second perceived spatial environment and the actual spatial environment; and detect a fault in the perception module based upon the third performance index.

14. The autonomous vehicle of claim 11, wherein the plurality of inputs to the perception module include vehicle dynamic data, map data and spatial environment data for the driving scenario, and wherein the instruction set executable to capture and store a plurality of frames of data associated with a driving scenario for the autonomous vehicle comprises the instruction set executable to periodically capture and store vehicle dynamic data, map data and spatial environment data during the driving scenario.

15. The autonomous vehicle of claim 11, wherein the spatial sensors comprise a digital camera.

16. The autonomous vehicle of claim 11, wherein the spatial sensor comprises one of a radar device and a lidar device.

17. The autonomous vehicle of claim 11, wherein the controller in communication with the perception module is disposed in a cloud-based computing system, and wherein the plurality of frames of data associated with the driving scenario for the autonomous vehicle are stored in the cloud-based computing system.

* * * * *